Aug. 7, 1956
C. O. CURELL
2,757,970
VEHICLE WHEEL ASSEMBLY
Filed Nov. 27, 1953
3 Sheets-Sheet 1
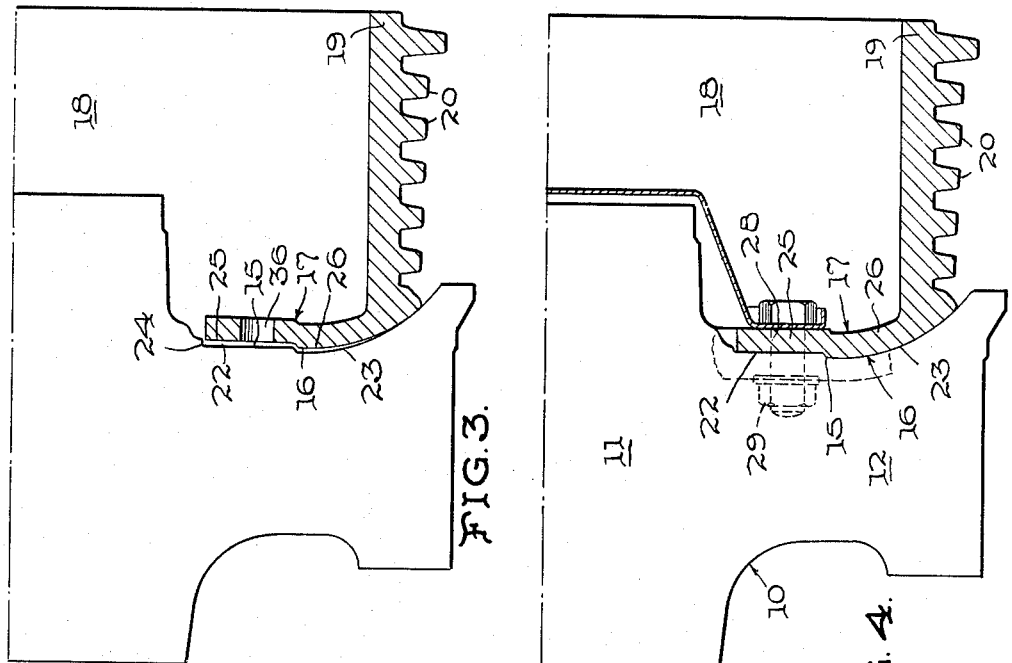
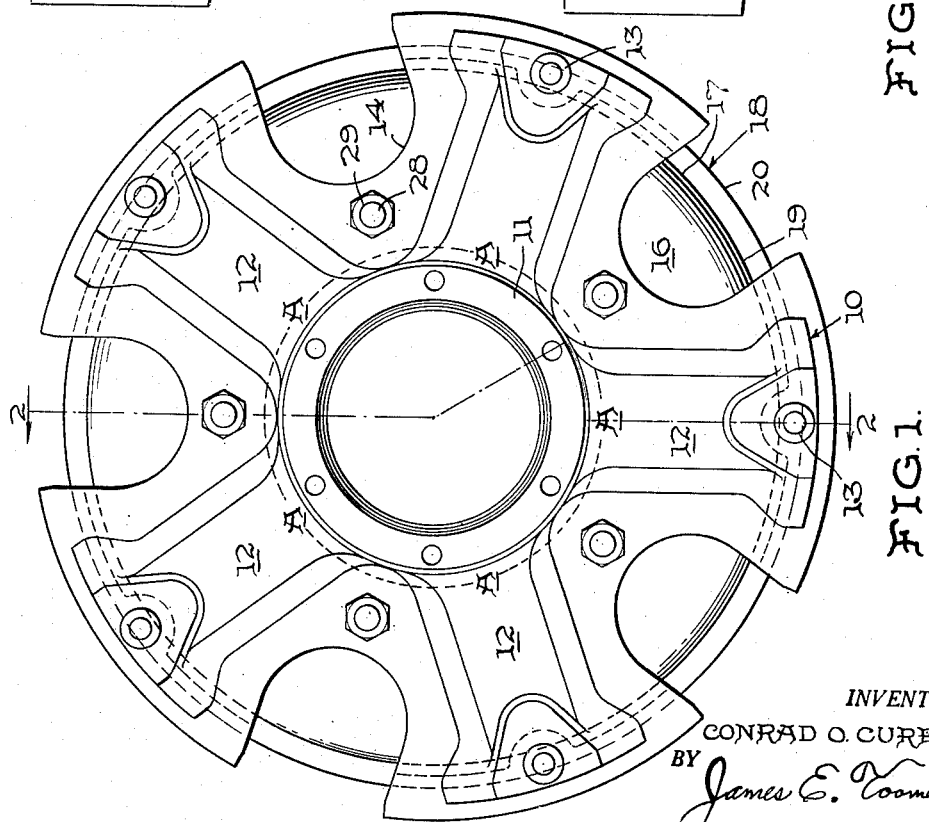
INVENTOR.
CONRAD O. CURELL
BY
James E. Toomey
ATTORNEY

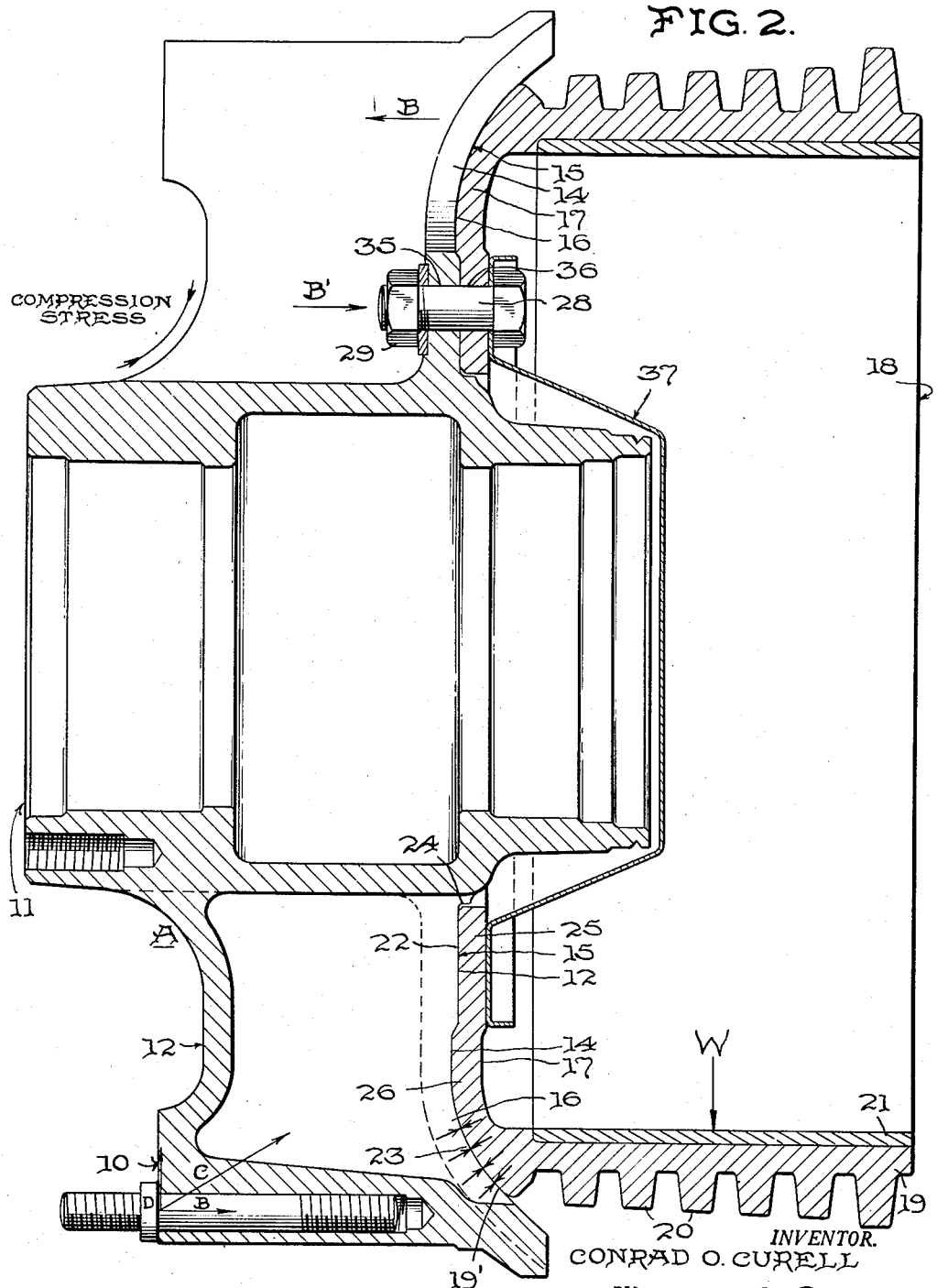

Aug. 7, 1956  C. O. CURELL  2,757,970
VEHICLE WHEEL ASSEMBLY
Filed Nov. 27, 1953  3 Sheets-Sheet 3

INVENTOR.
CONRAD O. CURELL
BY
James E. Toomey
ATTORNEY

United States Patent Office 2,757,970
Patented Aug. 7, 1956

2,757,970

VEHICLE WHEEL ASSEMBLY

Conrad O. Curell, Highland Park, Ill., assignor to Kaiser Aluminum & Chemical Corporation, Oakland, Calif., a corporation of Delaware Application November 27, 1953, Serial No. 394,549

19 Claims. (Cl. 301—6)

This invention relates to wheel assemblies for vehicles. More particularly, it is concerned with providing a novel method and arrangement for assembling a vehicle wheel, wherein in the case of a spoke type wheel, the spokes of the wheel at their point of intersection with the hub are prestressed as the result of the attachment of a brake drum thereto, and wherein in the case of a disc type wheel, the web of the disc at its point of peripheral intersection with the hub of the wheel will be prestressed as a result of the attachment of a brake drum thereto.

In the past, considerable difficulty has been experienced in making satisfactory vehicle wheels wherein the spoke and hub portion of the wheel are made in the form of an integral casting or forging and the like from a single piece of metal. For example, when the section of a vehicle wheel comprising the spokes and hub portion thereof are cast or forged from a single piece of aluminum, a point of weakness has been found to exist in the wheel at the intersection between the spokes and the hub. Consequently, when the wheel formed in this manner was attached to a vehicle and subjected to conventional load stresses, fractures would occur at this point of weakness thereby destroying the usefulness of the wheel.

By the instant invention, a novel method and arrangement for assembling the hub and spokes with a brake drum is provided wherein the spokes at their point of intersection with the hub of the wheel are initially prestressed thereby adding additional strength to the wheel at the aforesaid points of weakness, particularly during those times when the wheel is resisting a force which is the resultant of the vertical gravity load and the horizontal component applied as the vehicle is manipulating a turn and the wheel is on the outside. The prestressing feature reduces the tension stress in the fillet section or point of transition between the cast or forged spoke portions and the hub of the wheel by a predetermined amount of initial compressive stress intentionally applied thereto.

In addition, because of the particular manner in which the brake drum of the instant invention is applied to the hub and spoke portions of the wheel, a further advantage is obtained in that there will be an intimate high pressure contact between the spoke flanges of the wheel and the drum which will provide more rapid heat transfer from the drum to the relatively large volume of metal in the spokes, thereby reducing the operating temperature of the drum.

Furthermore, each spoke is adapted to support the brake drum in such a manner that it will effectively prevent deflection or bell-mouthing of the drum, which is a constantly reoccurring factor in conventional wheel assemblies. This bell-mouthing of a conventional drum may be said to be the result of forces acting normal to the friction face of the drum and are applied by the brake shoes. Deflection of the cylindrical drum being greater at its open end results in a bell-shaped drum having its largest diameter at the open end. On a conventional drum and wheel assembly where the drum flange is permitted to move in a horizontal direction, bell-mouthing is severe and objectionable.

The aforesaid advantages can also be obtained by assembling a disc type wheel in the manner proposed by the instant invention.

Accordingly, it is an object of this invention to minimize bell-mouthing of a brake drum on a vehicle wheel by preventing horizontal movement of the drum mounting flange during operation of the brake shoes.

It is a further object of this invention to provide a novel arrangement for attaching a brake drum to the hub and spokes of a wheel, in such a way during the initial assemblage of the same, whereby the spokes of the wheel at the points where they intersect with the hub, will be initially prestressed and remain prestressed for the purposes of adding additional strength to the spokes at these points.

It is a further object of this invention to provide a novel arrangement for attaching a brake drum to the hub and disc of a disc type wheel in such a way during the initial assemblage of the same, whereby the web of the disc at its point of peripheral contact with the hub of the wheel will be prestressed and remain prestressed for the purposes of strengthening the wheel at the point of transition between the hub and the disc.

It is a further object of this invention to provide a novel arrangement for attaching a brake drum to the hub and spokes of a wheel wherein the drum is placed in intimate high pressure contact with the spokes of the wheel, whereby during use of the wheel brakes there will be rapid heat transfer from the drum to the spokes thereby reducing the operating temperature of the drum.

It is a further object of this invention to provide a novel arrangement for attaching a brake drum to the hub and disc of a disc type wheel in such a way during the initial assemblage of the same, wherein the drum is placed in intimate high pressure contact with the wheel disc, so that during use of the wheel brakes, there will be rapid heat transfer from the drum to the disc thereby reducing the operating temperature of the drum.

It is a further object of this invention to provide a novel arrangement for attaching a brake drum to the hub and disc of a disc type vehicle wheel in such a way as to minimize deflection or bell-mouthing of the drum during use of the wheel.

It is another object of this invention to provide a novel arrangement for assembling a brake drum on a vehicle wheel with the spokes and hub of the vehicle wheel which are made in the form of a single casting, or forging and the like, wherein the spokes of the wheel at their point of intersection with the hub of the wheel will be prestressed.

It is another object of this invention to provide a novel arrangement for assembling a brake drum on a disc type vehicle wheel with the disc, which is made in the form of a casting, forging and the like, wherein the web of the disc at its point of peripheral contact with the hub of the wheel will be prestressed.

These and other objects are accomplished by providing in a vehicle wheel assembly the combination of a hub element and a plurality of radially extending spokes connected to the hub element. The inner portion of a spoke has a contacting face which is arcuate in cross-section. This contacting face is also advantageously provided with a recessed portion. The brake drum, which is attached to the wheel by being directly connected to the contacting faces of the wheel spokes, is provided with a flange which has a contacting face provided with a bulbous portion which is arcuate in cross-section. The radius of the arc on the bulbous portion of the drum flange is less than that of the recessed portion in each spoke and it is adapted to be received within and mated with the recessed portions in the contacting faces of the several spokes. Tension means are employed for forcing or compressing the flange of the drum snugly against the contacting face of a spoke including the bulbous portion on the contacting face of the drum flange. As a result of the action of the tension means in drawing or compressing the several elements together, each spoke at its point of intersection with the hub element will be prestressed.

In the case of a disc type wheel, the inner face of the disc is provided with a contacting face of arcuate shape in cross section. The brake drum which is attached to the wheel by being connected to both the disc and wheel hub, is provided with a flange. This flange has a contacting face provided with a bulbous portion which is arcuate in cross-section. The radius of the arc on the bulbous portion of the drum flange is less than that of the contacting face of the wheel disc, and the bulbous portion of the drum flange is adapted to be mated with the contacting face of the disc. Tension means are employed for forcing or compressing the bulbous portion of the drum flange snugly against the contacting face of the disc. As a result of the action of the tension means in the drawing or compressing the several elements together, the web of the wheel disc will be prestressed at the point of its peripheral contact with the hub element.

Other objects and advantages of the instant invention will become more apparent from a review of the following detailed description when taken in conjunction with the appended drawings, wherein:

Figure 1 is a front elevational view of the partially assembled spoke type wheel of the instant invention;

Figure 2 is a sectional view of the partially assembled wheel of Figure 1 when taken along lines 2—2 thereof;

Figure 3 is a diagrammatic view of the hub and spokes of the wheel and the brake drum of Figures 1 and 2 just prior to the assemblage thereof;

Figure 4 is another diagrammatic view of the hub and spokes of the wheel and the brake drum of Figures 1 and 2 when assembled and locked together;

Figure 6:
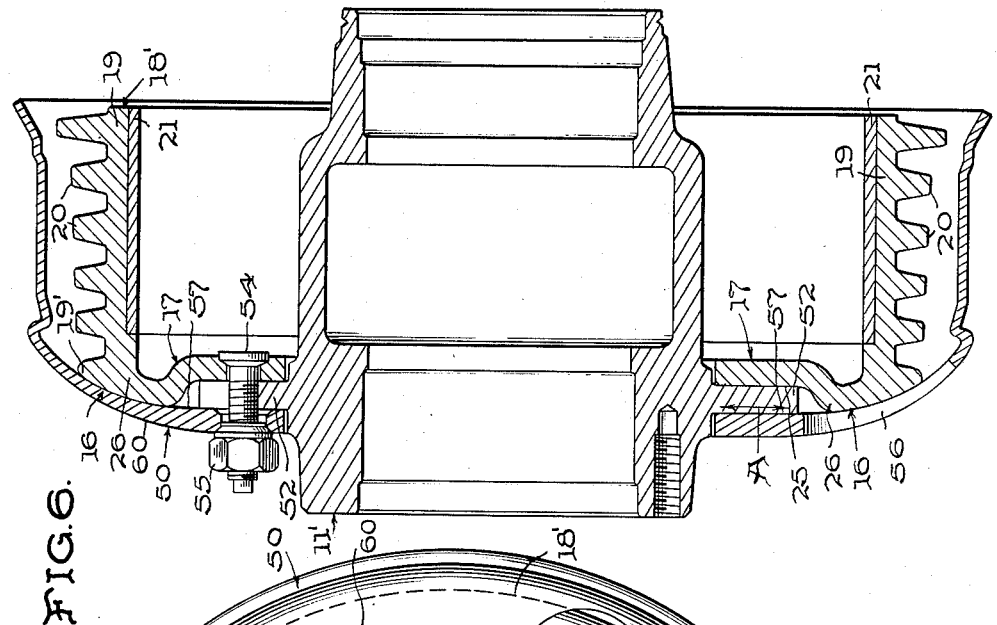
Figure 6 is a sectional view of the partially assembled wheel of Figure 5 when taken along lines 6—6 thereof.

By referring to the drawings and particularly Figures 1 and 2, it will be seen that the vehicle wheel 10 of the instant invention may be comprised of an annular hub portion 11 from which a plurality of spokes 12 project radially therefrom.

In the preferred embodiment of the invention, that portion of the wheel consisting of the hub portion 11 and spokes 12 is advantageously cast or forged from a single piece of metal such as aluminum, whereby the spokes 12 and hub portion 11 will be formed integrally with one another.

Attached to the outer extremities of each spoke along the outer surface thereof is a stud bolt 13 by means of which the hub portion and spokes of the wheel may be affixed to a suitable rim member (not shown). In addition, each spoke may be so formed that it gradually increases in cross-section from the outside to the inside of the wheel so that it is provided with an inner portion 14 of substantial area. Each inner portion 14 of the spokes 12 is provided with a large contacting face 15, against which the large and stepped contacting face 16 of the annular flange 17 of the brake drum 18 is adapted to be pressed when the brake drum 18 is brought into contact and locked with the spokes and hub of the wheel 10.

The outer peripheral portion 19 of the brake drum 18 is advantageously provided with a plurality of heat dissipating fins 20, while the inner periphery of the brake drum 18 may be provided with a steel liner 21, which is adapted to be contacted directly by the brake shoes (not shown) of the brake elements so as to minimize wear upon the brake drum 18, when the brake drum is made in the form of an aluminum casting.

By referring to the drawings, it will be noted that the brake drum flange 17 is located at substantially a right angle to the outer peripheral portion 19 of the brake drum 18 and this is the portion of the brake drum which is in intimate contact with the spokes 12 of the wheel.

The contacting face portion 15 of each wheel spoke 12 may be provided with a plurality of stepped recesses 22 and 23 which are contiguous with one another. It will be noted that one end of the flat, planar portion of recess 22 may be bounded by a suitable shoulder element 24, while the other recess 23 of a predetermined length and width on the spoke is formed in such a way that it slopes inwardly and away in the form of an arc from the hub 11 and toward the brake drum 18.

In order to prestress each of the spokes 12 at the point A where a spoke member intersects the hub portion 11 on the wheel, this point having been found in the past to be a point of weakness and easy fracture when the spokes and the hub portion of the wheel were cast or forged from a single piece of metal such as aluminum, the contact face 16 of the flange 17 of the brake drum 18 may be provided with a plurality of stepped or bulbous portions 25 and 26. The stepped portion 26 as indicated particularly in Fig. 3 has substantially the same arcuate configuration in cross-section as the sloping recess 23 on each spoke.

However, it will also be noted that the radius of the arc formed by this projecting step 26 is less than the radius of the arc of the recess 23 on the spoke within which stepped portion 26 of the drum 18 is receivable and it is not concentric therewith. Consequently, under normal conditions, the bulbous portion 26 will not fit snugly against arcuate recess 23 on the spoke throughout its entire periphery when the contacting face 16 of the drum flange 17 is brought into contact with the contacting face 15 on a spoke. Additional force must, therefore, be used in order to close the gap between the contacting face 16 on drum flange 17 and the contacting face 15 on a spoke. When this gap is closed as a result of the installation and tightening or tensioning of the mounting bolts and nuts 28 and 29 respectively, with the bolt 28 being insertable within suitable recesses 35 and 36 in a spoke 12 and in the flange 17 of the drum, an initial stress will be placed upon the drum flange 17, which in turn will produce a couple in each spoke as indicated in Fig. 2 by the forces B and B' acting on the spoke, the directions of these forces being shown in Fig. 2. The compressive stress produced in each spoke at point A, or at the hub fillet, is the result of its resisting counterclockwise rotation of the spoke produced by the couple as viewed in Fig. 2. High pressure, intimate contact between the spoke face and the entire periphery of the outer face of the drum flange is also obtained. A suitable annular shield or cover plate 37 may also be attached to the hub portion 11 of the wheel 10 by means of the bolts 28 and nuts 29.

As a result, one of the advantages that immediately occurs, since the drum 18 is in high pressure and intimate contact over a substantial area with the wide contacting faces 15 of the spokes 12 of the wheel 10, is that a greater, more rapid heat transfer will be accomplished between the drum 18 and the relatively large spokes during application of the brakes of the vehicle, thereby reducing the operating temperature of the drum.

In addition, the drum 18 will provide additional strength for each of the spokes 12 at their points of intersection A with the hub portion 11 of the wheel when a spoke 12 is resisting a force, which as indicated by the force diagram shown in Fig. 2, is the resultant C of the vertical gravity load D and the horizontal component B, these latter two forces being applied when a vehicle to which the wheel is attached, fo rexample, is manipulating a turn and the wheel is on the outside.

Furthermore, when each spoke 12 is drawn into tight engagement with the brake drum 18 in the manner described, the end of drum flange 17 immediately adjacent the outer peripheral portion 19 as well as the outer peripheral portion 19 are held in high pressure contact with the spoke face because of the large width or diameter of the flange 17, thereby producing a high degree of fixity at the end 19' of the drum peripheral portion 19. Considering peripheral portion 19 as a cantilever beam supporting a vertical load W which occurs when the brakes of a vehicle are applied, the fixity of peripheral portion 19 provided by the invention is infinitely greater than that provided in all conventional installations in which the drum flange face, because of its construction, contacts the wheel only in the immediate area of the mounting bolt circle. The greater fixity provided by the invention results in less deflection or bell-mounting of the drum as a result of the action of the force or vertical load W.

Figure 5:
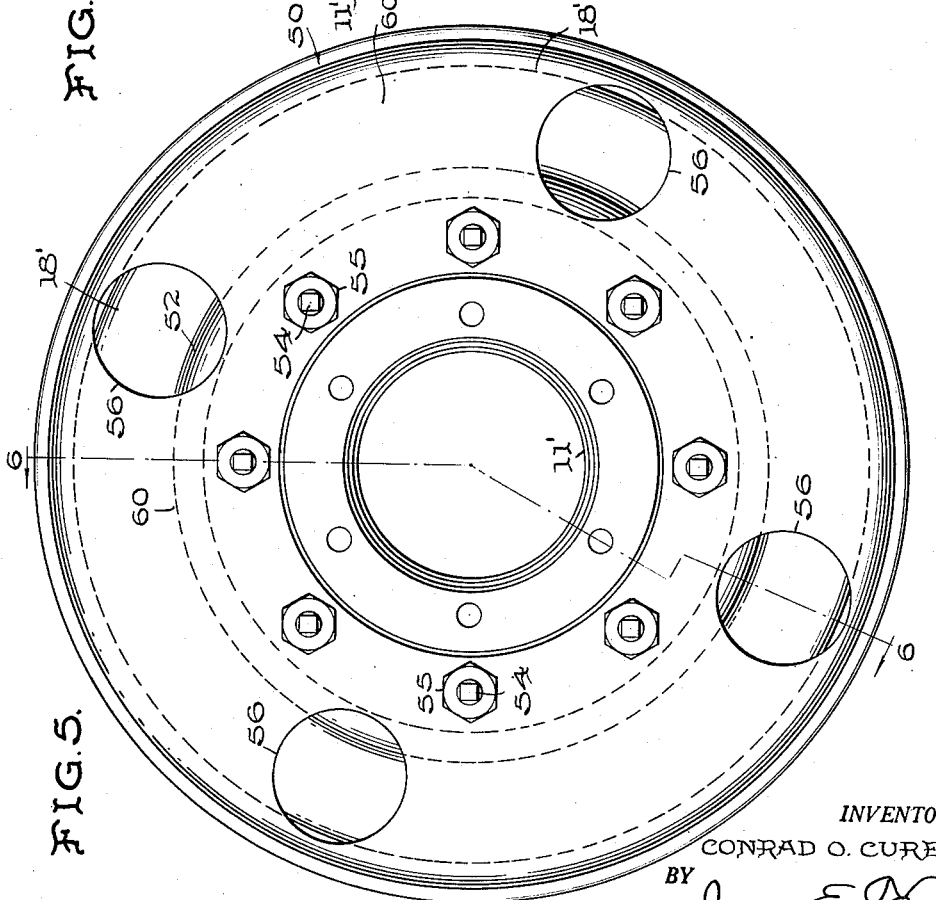
Figure 5 is a front elevational view of a partially assembled disc type wheel.

The advantageous features of the instant invention are likewise applicable to disc type wheels. As indicated in Figs. 5 and 6, in the case of disc type wheels, the annular cup-shaped forged or cast disc 50 to which a rim (not shown) is attached and the brake drum 18' may be advantageously affixed to the annular rib 52 projecting from the main body portion of the forged or cast hub 11' by means of a plurality of stud bolts 54 and nuts 55.

The annular cup-shaped disc 50 may also be provided with a plurality of apertures 56 located in the web portion 60 of the disc. The inner surface of the web portion 60 of disc 50 is provided with a sloping drum contact face 57, which is arcuate in cross-section. The brake drum 18' may be constructed in substantially the same fashion as the brake drum used on the spoke type wheel shown in Figs. 1–4.

Thus, since the radius of the arc formed by the projecting step 26 on the flange 17 of drum 18' is less than the radius of the arc formed by the sloping drum contact face 57 on the inside of the disc 50 and is not concentric therewith, under normal conditions step 26 will not fit snugly against face 57. However, upon the installation and tightening or tensioning of bolts 54 and nuts 55, step 26 of the drum 18' can be drawn tightly against contact face 57 of the disc 50 and an initial compressive stress will be placed upon the web 60 of the disc 50 at the zone A, or at the point of peripheral contact between the hub 11' of the wheel and the disc 50. The advantages flowing from this arrangement will be substantially the same as those mentioned above in the discussion of the spoke type vehicle wheel assembly of the instant invention.

Although the instant invention has been described as being particularly applicable to prestressing spoke members at their points of intersection with a hub where the spokes and the hub are cast or forged from a single piece of aluminum and in the case of disc type wheels, where the disc is forged or cast from aluminum, it is obvious that the same advantages will obtain by utilizing the invention on wheels wherein the spokes and hub and/or disc of the wheel are cast or forged from other metals such as steel, magnesium, etc. Accordingly, the invention is not limited to the use of the vehicle wheel assembly wherein the disc and/or spokes and hub of the wheel are cast or forged solely from aluminum.

It is obvious that various changes and modifications may be made in the invention without departing from the spirit and scope thereof as defined by the appended claims, wherein what is claimed is:

1. A vehicle wheel of the type described comprising the combination of a hub and a plurality of spokes projecting radially outward therefrom, the inner surface of a spoke being provided with a contact face, said contact face including a flat planar portion and an indented portion adjacent the planar portion and projecting in an arc away therefrom, and means including a brake drum contacting said contact face of a spoke for prestressing said spoke at the point of intersection of said spoke and said hub by inducing a force couple in said spoke.

2. The combination as defined in claim 1, wherein the spokes and hub are formed of a single piece of metal.

3. The combination as recited in claim 2, wherein the single piece of metal is aluminum.

4. A vehicle wheel of the type described comprising the combination of a hub and a plurality of spokes projecting radially outward from said hub, the inner surface of each spoke being provided with a contact face, said contact face including a flat planar portion and a recess adjacent said planar portion and projecting in an arc away therefrom, a brake drum provided with a contact face having a projecting portion adapted to be received within the recess of said spoke, said projecting portion on the drum being of a similar configuration and a different radial dimension than said recess on said contact face of a spoke, and tension means acting upon the drum and the hub forcing the contact face of said brake drum, including the projecting portion thereon, into snugly interfitting engagement with the contact face of a spoke to produce a force couple in said spoke whereby the spoke at the point of its intersection with the said hub will be prestressed.

5. The combination of claim 4, wherein the hub and spokes are formed integrally from a single piece of metal.

6. A vehicle wheel comprising the combination of a hub element, a plurality of spokes projecting radially outward therefrom, the inner portion of a spoke having a contacting face of large surface area and said contacting face having a recess thereon, a brake drum connected to said hub element and provided with a contact face for engaging the contact face of the spoke, said contact face of the drum having a projecting portion receivable within the recess on the contact face of the spoke, said projecting portion on said drum being of a similar configuration and a different radial dimension than said recess on said contact face of the spoke, and tension means deformably forcing the contact face of the drum, including the projecting portion thereon, snugly against the contact face of the spoke whereby the spoke at its point of intersection with the said hub element will be prestressed.

7. In a vehicle wheel assembly, the combination of a hub element and a plurality of radially extending spokes connected to the said hub element and formed integrally therewith, the inner portion of each spoke having a contacting face, said contacting face having a plurality of contiguous and stepped recessed portions, the recess portion furtherest removed from the hub element projecting in an arc away from the main body of the spoke, a brake drum provided with a flange having a stepped contacting face, the stepped portions on said contacting face of said flange being receivable within the recessed portions on the spoke, one of the stepped portions on the contacting faces of the drum flange also having an arcuate configuration, whereby said arcuate stepped portion on said drum may be seated in said arcuate recessed portion in said spoke, said arcuate stepped portion on said drum also being of a different radial dimension than said arcuate recessed portion on said spoke, and tension means deformably forcing the contact flange of said drum snugly against for locking said flange including the arcuate stepped portion thereof to the contacting face of the spoke to induce a force couple in said spoke and thereby prestress the spoke at its point of intersection with the hub element.

8. A vehicle wheel comprising the combination of a hub element and a plurality of radially extending spokes connected to the said hub element and formed integrally therewith, the inner portion of a spoke having a contacting face, said contacting face having a plurality of contiguous and stepped recessed portions, the recessed portion furthest removed from the hub element projecting in an arc away from the main body of the spoke, a brake drum provided with a finned portion and an inner flange projecting away from said finned portion at a transverse angle thereto, said flange having a contacting face provided with a plurality of projecting steps adapted to be received within the stepped recess portions located on the contact face of the spoke, the projecting step on said flange of said drum which is closest to said finned portions also projecting away from said spoke in an arc of smaller radius than the arc of said arcuate recessed portion on the spoke, the arc of said projecting step on said flange also being drawn from a different center point than the arc of said recessed portion on said spoke, and tension means for distorting the contacting face on the flange of the said drum against the contacting face on the said spoke, and for pressing the arcuate projecting step on said flange into the arcuate recessed portion on the spoke to induce a stressed condition in said spoke such that the spoke will be prestressed at its point of intersection with the hub element and bell-mouthing of the drum will be minimized.

9. The combination defined in claim 8 wherein the hub and spokes are made from a single piece of aluminum.

10. In a vehicle wheel assembly, the combination of hub means, rim attachment means connected to said hub means, a brake drum, and means acting upon said brake drum and said rim attachment means deformably fastening the brake drum and said rim attachment means to produce prestressing of said rim attachment means at the point of intersection between said rim attachment means and said hub means.

11. The combination defined in claim 4, wherein said rim attachment means includes a disc member.

12. In a vehicle wheel assembly, the combination of hub means, rim attachment means connected to said hub means, said rim attachment means also being provided with an inner contact face, a brake drum connected to said hub means and in surface contact with said inner contact face on said rim attachment means, and means acting upon said drum and said rim attachment means to deformably force said drum and rim attachment means into snug engagement thereby inducing a prestressed condition in said rim attachment means at the point of intersection between said rim attachment means and said hub means.

13. In a disc type vehicle wheel, the combination of a hub, a cup-shaped disc connected to said hub, said disc being provided on the inner face thereof with an arcuate surface, a brake drum also affixed to said hub, said drum being provided with an arcuate bulbous portion adapted to be placed in face to face contact with said arcuate surface on the said disc, the radius of the arc of said bulbous portion being smaller than the radius of the arc of said arcuate surface of the disc, and tension means deformably forcing the bulbous portion of the drum into intimate high pressure contact with said arcuate surface of the inner face of the disc for maintaining said high pressure contact to produce a prestressed condition in said disc at its point of peripheral contact with said hub.

14. In a disc type vehicle wheel assembly of the type described, the combination of a hub, an annular flange on the said hub, a cup-shaped disc connected to said hub flange, said disc having an arcuate surface on the inner face thereof, a brake drum connected to said hub flange, said drum being provided with a flange arcuate in cross-section adapted to be placed in face to face contact with said arcuate surface on the said disc, the radius of the arc of said arcuate flange on the drum being smaller than the radius of the arcuate surface on the inner face of the disc, and tension means acting upon both the hub and the disc for forcing the arcuate flange of the drum into intimate high pressure contact with said arcuate surface on the inner face of the disc and for maintaining said pressure contact, whereby said disc at its point of peripheral contact with the hub flange will be prestressed.

15. In a disc type vehicle wheel, the combination of a hub, a disc connected to said hub, said disc being provided on the inner face thereof with an arcuate surface, a brake drum also attached to said hub, said drum being provided with an arcuate bulbous portion adapted to be placed in face to face contact with said arcuate surface on said disc, said arcuate bulbous portion also being of a different radial dimension than said arcuate surface on said disc, and tension means for forcing the bulbous portion of the drum into intimate high pressure contact with said arcuate surface on the inner face of the disc by deforming said drum and maintaining said high pressure contact whereby said disc at its point of peripheral contact with said hub will be prestressed.

16. In a vehicle wheel of the type described, the combination of a hub and a rim supporting member extending radially outward from said hub, the inner surface of the rim supporting member having a contact face including an arcuate portion, a brake drum having a contact face including a projecting portion, said projecting portion having a different radial dimension than the arcuate portion of said contact face of the rim supporting member, and tension means acting upon the drum and the rim supporting member forcing the contact face of the drum into snug interfitting engagement with the contact face of the rim supporting member to produce a condition of prestress in the portion of the rim supporting member located adjacent said hub.

17. The combination defined in claim 16, wherein the rim supporting member is made from a single piece of metal.

18. The combination as recited in claim 16, wherein the rim supporting member comprises a disc.

19. The combination as defined in claim 16, wherein the rim supporting member comprises a radial spoke member.

References Cited in the file of this patent

UNITED STATES PATENTS

| | | |
|---|---|---|
| 1,414,375 | Putnam | May 2, 1922 |
| 1,471,356 | Reid | Oct. 23, 1923 |
| 1,978,026 | Miller | Oct. 23, 1934 |
| 2,021,355 | Farr et al. | Nov. 19, 1935 |